United States Patent
Yu et al.

(10) Patent No.: US 9,547,605 B2
(45) Date of Patent: Jan. 17, 2017

(54) METHOD FOR DATA BACKUP, DEVICE AND SYSTEM

(71) Applicant: Huawei Technologies Co., Ltd., Shenzhen, Guangdong (CN)

(72) Inventors: Zhou Yu, Shenzhen (CN); Shaoyong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 506 days.

(21) Appl. No.: 13/687,833

(22) Filed: Nov. 28, 2012

(65) Prior Publication Data

US 2013/0091334 A1 Apr. 11, 2013

Related U.S. Application Data

(63) Continuation of application No. PCT/CN2011/077945, filed on Aug. 3, 2011.

(51) Int. Cl.
*G06F 21/53* (2013.01)
*G06F 12/16* (2006.01)
(Continued)

(52) U.S. Cl.
CPC .......... *G06F 12/16* (2013.01); *G06F 9/45558* (2013.01); *G06F 11/1458* (2013.01); *G06F 11/1484* (2013.01); *G06F 11/1456* (2013.01)

(58) Field of Classification Search
CPC .............. G06F 9/45558; G06F 9/45533; G06F 9/45541; G06F 9/455; G06F 11/0712; G06F 2009/4557; G06F 2009/45583; G06F 2201/815; G06F 9/4418; G06F 11/1458; G06F 11/1469; G06F 11/0778; G06F 11/1484; G06F 9/4881; G06F 9/50; G06F 9/5011
See application file for complete search history.

(56) References Cited

U.S. PATENT DOCUMENTS 3,858,182 A * 12/1974 Delagi et al. ................. 726/16
7,152,080 B2 12/2006 Mikami
(Continued)

FOREIGN PATENT DOCUMENTS

CN 1812345 A 8/2006
CN 101819545 A 9/2010
(Continued)

OTHER PUBLICATIONS

International Search Report in corresponding International Patent Application No. PCT/CN2011/077945 (May 10, 2012).
(Continued)

*Primary Examiner* — David X Yi
*Assistant Examiner* — Candice Rankin
(74) *Attorney, Agent, or Firm* — Leydig, Voit & Mayer, Ltd.

(57) ABSTRACT

A method for backing up data in a data center, device and system are provided. The data in all the VMs of one data center can be backed up simultaneously, and the associations between the VMs are also backed up during the backup, so it is unnecessary to concern the recovery orders of the VMs when the data of the data center is recovered. Meanwhile, when the stored data is exported from the hypervisor node, it is unnecessary to notify the upper layer OS for a backup, thereby improving the data backup efficiency and reducing the system logical complexity.

15 Claims, 3 Drawing Sheets

(51) Int. Cl.
*G06F 9/455* (2006.01)
*G06F 11/14* (2006.01)

(56) References Cited

U.S. PATENT DOCUMENTS

| | | |
|---|---|---|
| 7,779,034 B2 | 8/2010 | Pedersen et al. |
| 7,904,540 B2 | 3/2011 | Hadad et al. |
| 8,607,009 B2 * | 12/2013 | Nicholas et al. ............. 711/162 |
| 8,825,984 B1 * | 9/2014 | Srinivasan et al. ........... 711/206 |
| 2003/0236945 A1 | 12/2003 | Nahum |
| 2009/0037162 A1 | 2/2009 | Gaither et al. |
| 2009/0043878 A1 | 2/2009 | Ni |
| 2009/0119233 A1 | 5/2009 | Dunagan et al. |
| 2009/0276861 A1 | 11/2009 | Russo et al. |
| 2010/0106615 A1 | 4/2010 | Chadwick et al. |
| 2010/0106764 A1 | 4/2010 | Chadwick et al. |
| 2010/0107085 A1 | 4/2010 | Chadwick et al. |
| 2010/0125712 A1 | 5/2010 | Murase et al. |
| 2010/0228934 A1 | 9/2010 | Chandrasekaran et al. |
| 2010/0250744 A1 | 9/2010 | Hadad et al. |
| 2010/0262974 A1 | 10/2010 | Uyeda |
| 2010/0274876 A1 * | 10/2010 | Kagan et al. ................ 709/221 |
| 2011/0010268 A1 | 1/2011 | De Marchi et al. |
| 2012/0011254 A1 * | 1/2012 | Jamjoom et al. ............ 709/226 |
| 2012/0017037 A1 * | 1/2012 | Riddle et al. ................ 711/103 |
| 2012/0066474 A1 * | 3/2012 | Funk ............................ 711/207 |

FOREIGN PATENT DOCUMENTS

| | | |
|---|---|---|
| CN | 102096606 A | 6/2011 |
| CN | 102103524 A | 6/2011 |

OTHER PUBLICATIONS

1$^{st}$ Office Action in corresponding Chinese Patent Application No. 201180001517.7 (Jan. 14, 2013).

2$^{nd}$ Office Action in corresponding Chinese Patent Application No. 201180001517.7 (Jun. 19, 2013).

* cited by examiner

METHOD FOR DATA BACKUP, DEVICE AND SYSTEM

CROSS-REFERENCE TO RELATED APPLICATIONS

This application is a continuation of International Patent Application No. PCT/CN2011/077945, filed on Aug. 3, 2011, which is hereby incorporated by reference in its entireties.

FIELD OF THE INVENTION

The present invention relates to the field of IT, and particularly to a method for data backup of a data center.

BACKGROUND OF THE INVENTION

With the development of the communication technology, more and more data centers employ the virtualization technology, which abstracts and then rearranges the computer system hardware, and a virtualization software layer runs between the computer hardware platform and the Operation System (OS). The virtualization software layer is generally called as hypervisor and capable of running multiple OSs on a plurality of computer hardware platforms.

A data center employing the virtualization technology no longer runs a single operation system, thus the backup and deployment for the data center gradually change from the backup and deployment of the OS and the application program to those of the Virtual Machines (VMs) at the data center, and the VMs are usually orderly backed up or deployed. This backup mode is generally notified to the OSs of the VMs by the management software of the data center, so as to complete all the operations. But the backups are just limited to respective VMs, while the associations between the VMs cannot be backed up. That is, the backup of each VM is completed under the OS of the VM, while there is no association between the backups of respective VMs.

During the research and practice of the prior art, the inventor finds that in the current implementation, when the VMs of the data center are directly associated with each other, and their running states depend on one another, it is complicated to back up each separate system (corresponding to one VM) of the data center and then perform a separate recovery, and a mis-operation may be easily caused, thus the backed up data center is not fully consistent with the original data center system. In addition, the data center system may be composed of a plurality of computation nodes, and the dynamic data (memory information) of each VM will be probably distributed at multiple different computation nodes, thus the data backup made by a VM may influence other VMs running at the same node.

SUMMARY OF THE INVENTION

For this reason, the embodiments of the present invention provide a method for virtualized data migration or backup, and a method, device and system for virtualized data rearrangement, so as to uniformly backing up the data in all VMs of the data center, thereby improving the backup efficiency.

For this purpose, the embodiments of the present invention provide a data center for data backup, including a plurality of computation nodes and a backup manager, each computation node comprises a hypervisor, the hypervisor of each computation node creates a plurality of virtual machines in the computation node, and each virtual machine in the computation node shares memory resources of the data center;

The hypervisor of each computation node is used to export data of the virtual machines in the computation node and store the exported data to a storage apparatus;

The backup manager, communicating with the storage apparatus is used to obtain profiles of the virtual machines in the plurality of computation nodes, wherein the profiles of the virtual machines in the plurality of computation nodes comprises a memory segment address of each virtual machine allocated in a manner of uniform address allocation in the memory resources shared by the virtual machines in the computation nodes, and rearrange the stored data in the storage apparatus according to the memory segment address of each virtual machine.

The embodiments of the present invention further provide a method for data backup, the data comprises a plurality of computation nodes and a backup manager, each computation node comprises a hypervisor, the hypervisor of each computation node creates a plurality of virtual machines in the computation node, and each virtual machine in the computation node shares memory resources of the data center;

The method including:

exporting, by the hypervisor of each computation node, data of the virtual machines in the computation node and store the exported data to a storage apparatus;

obtaining, by the backup manager communicating with the storage apparatus, profiles of the virtual machines in the plurality of computation nodes, wherein the profiles of the virtual machines in the plurality of computation nodes comprises a memory segment address of each virtual machine allocated in a manner of uniform address allocation in the memory resources shared by the virtual machines in the computation nodes; and rearranging, by the backup manager, the stored data in the storage apparatus according to the memory segment address of each virtual machine.

Correspondingly, the embodiments of the present invention provide a computation node for backing up data of a data center, wherein the data center comprises a plurality of computation nodes and a backup manager, each computation node comprises a hypervisor, the hypervisor of each computation node creates a plurality of virtual machines in the computation node, and each virtual machine in the computation node shares memory resources of the data center;

each computation node, used to, export data of the virtual machines in the computation node and store the exported data to a storage apparatus; one of the computation nodes, used to, obtain profiles of the virtual machines in the plurality of computation nodes, wherein the profiles of the virtual machines in the plurality of computation nodes comprises a memory segment address of each virtual machine allocated in a manner of uniform address allocation in the memory resources shared by the virtual machines in the computation nodes, and rearrange the stored data in the storage apparatus according to the memory segment address of each virtual machine.

As can be seen from the above technical solutions, in the embodiment of the present invention, the data in all the VMs of one data center can be backed up simultaneously, and the associations between the VMs are also backed up during the backup, so it is unnecessary to concern the recovery orders of the VMs when the data of the data center is recovered. Meanwhile, when the stored data is exported from the hypervisor node, it is unnecessary to notify the upper layer OS for a backup, thereby improving the data backup efficiency and reducing the system logical complexity.

DETAILED DESCRIPTION OF THE PREFERRED EMBODIMENTS

In order that a person skilled in the art can better understand the solutions of the embodiments of the present invention, the embodiments of the present invention are further described in details with reference to the drawings and examples.

In order to facilitate the understanding by a person skilled in the art, the virtualized data center will be briefly introduced before the present invention.

The virtualized data center is usually composed of at least two computation nodes, at each of which a hypervisor (called as hypervisor node in the present invention) runs. The hypervisor abstracts and reorganizes the physical memory, the processor and the I/O resource of the computation nodes in the data center, and create a plurality of virtual machines. Thus the hypervisor may be regarded as a resource ownership conversion module. In the virtualized data center, only the hypervisor can access all the computation node physical resources.

Figure 1:
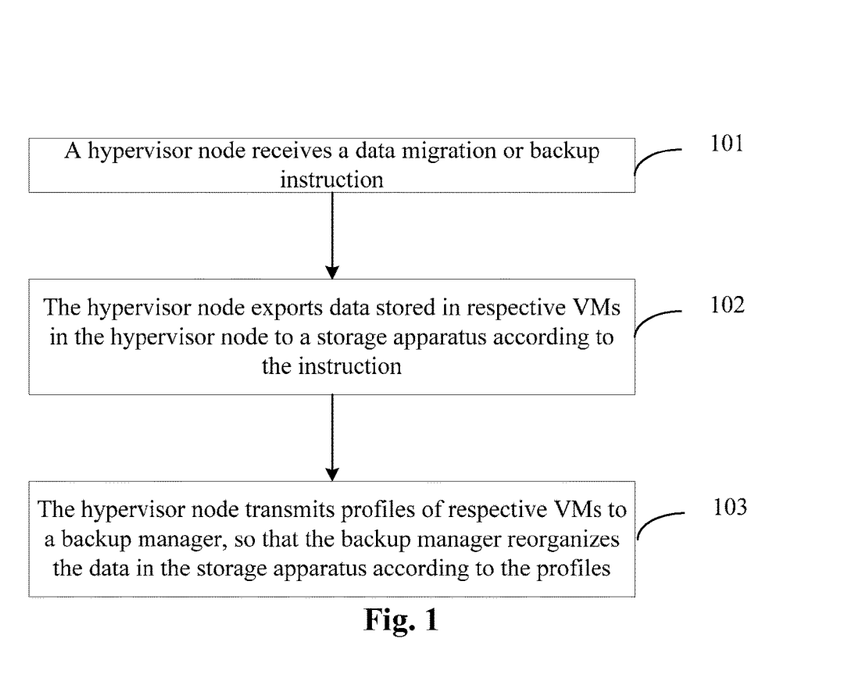
FIG. 1 is a flowchart of a method for virtualized data migration or backup provided by an embodiment of the present invention.

Please refer to FIG. 1, which is a flowchart of a method for virtualized data migration or backup provided by an embodiment of the present invention. The method includes:

Step 101: a hypervisor node receives a data migration or backup instruction;

wherein in this step, the hypervisor node may receive a data migration or backup instruction transmitted by a manager of the VM or the VM OS, but the present invention is not limited thereto. A data migration or backup instruction transmitted by other upper layer node may be received.

Step 102: the hypervisor node exports data stored in respective VMs in the hypervisor node to a storage apparatus, according to the instruction;

wherein, this step specifically includes: a processor managing unit in the hypervisor node stops scheduling the CPUs of respective VMs according to the instruction, and stores the data of respective VMs to connected memories; the hypervisor node applies for a segment of storage space in the storage apparatus connected thereto, records the node number of the hypervisor node in the storage space, and exports the data in all the memories to the storage space.

Step 103: the hypervisor node transmits profiles of respective VMs to a backup manager, so that the backup manager rearranges the data in the storage apparatus according to the profiles.

In the embodiment of the present invention, after receiving the data migration or backup instruction, the hypervisor node may export the data stored in all the VMs under the hypervisor node to the storage apparatus at one time. That is, the hypervisor node is capable of uniformly backing up the data stored in all the VMs of a data center at one time, so that the recovered or migrated data center is completely consistent with the original data center.

Figure 2:
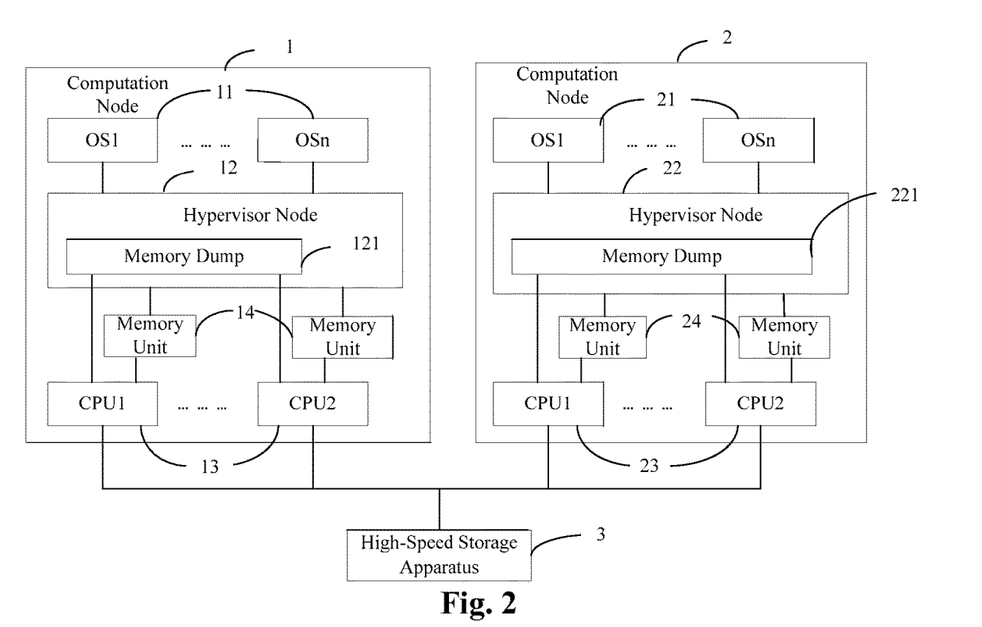
FIG. 2 is an application instance diagram of a memory data export in a method for virtualized data migration or backup provided by an embodiment of the present invention.

Please refer to FIG. 2, which is an application instance diagram of a memory data export in a method for virtualized data migration or backup provided by an embodiment of the present invention, and also a schematic diagram in which the method is applied to backing up data at the hypervisor side of a virtual data center. In this embodiment, a memory dump is added to the Hypervisor, so as to export the data stored in the computation nodes managed by the Hypervisor.

As illustrated in FIG. 2, this embodiment for example employs two computation nodes (i.e., computation node 1 and computation node 2), wherein computation node 1 includes OSs 11 (i.e., OS1 to OSn), a hypervisor 12, CPUs 13 and memory units 14 which are connected orderly. Meanwhile, the memory units 14 are also connected to the hypervisor 12 that includes a memory dump 121.

Computation node 2 includes OSs 21 (i.e., OS1 to OSn), a hypervisor 22, CPUs 23 and memory units 24 which are connected orderly. Meanwhile, the memory units 24 are also connected to the hypervisor 22 that includes a memory dump 221.

A high-speed storage apparatus 3 is connected to all the CPUs in computation nodes 1 and 2, respectively.

As illustrated in FIG. 2, when the hypervisor receives a data migration or backup instruction transmitted by the OS (any of OS1 to OSn), i.e., when the system triggers the backup flow, the processor managing unit of the hypervisor stops scheduling the CPUs, and the hypervisor writes all the unwritten cache data at the virtual machine into the memory of the virtual machines.

The hypervisor applies for a segment of storage space in the storage apparatus connected thereto. Firstly, the hypervisor writes its node number into the storage space, and then exports all the data in the memory of the virtual machines to the storage space.

Wherein, it is suggested that the storage space should use an I/O storage directly connected to the CPU, i.e., the high speed storage apparatus illustrated in FIG. 2, because the server acting as a data center generally has a mass memory capacity, and the efficiency is low and much time will be cost if the transmission is carried out with the IO Adapt of the conventional channel. But the storage space is not limited to the above, and may be other storage apparatus connected to the CPU.

Figure 3:
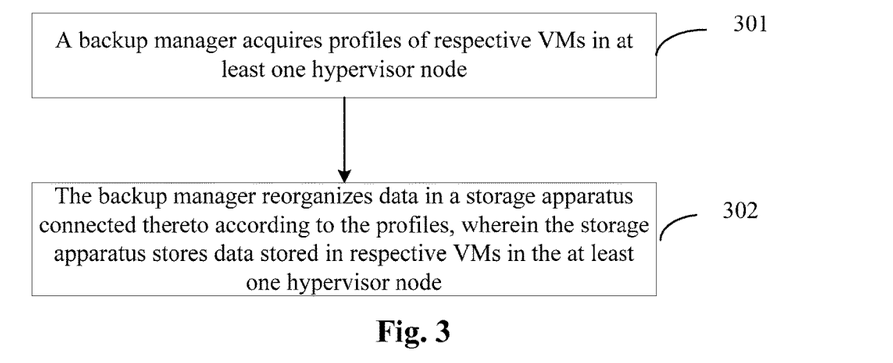
FIG. 3 is a flowchart of a method for virtualized data rearrangement provided by an embodiment of the present invention.

Please refer to FIG. 3, which is a flowchart of a method for virtualized data rearrangement provided by an embodiment of the present invention. Based on the embodiment illustrated in FIG. 1, the method includes:

step 301: a backup manager obtains profiles of respective VMs of at least one hypervisor node; and step 302: the backup manager rearranges data in a storage apparatus connected thereto according to the profiles, wherein the storage apparatus stores data stored in respective VMs in the at least one hypervisor node.

Wherein in step 301, one acquiring mode is that the backup manager searches data (i.e., a memory file) exported from at least one hypervisor node, obtains a node number of the hypervisor node from the memory file, and obtains memory distribution information of uniform address allocation from a hypervisor configuration file of the hypervisor node according to the node number.

The other acquiring mode is that the backup manager receives the profiles of respective VMs transmitted by at least one hypervisor node regularly or in real time.

In step 302, the process of reorganizing the data in the storage apparatus according to the profiles includes: the backup manager rearranges the data in the storage apparatus based on memory segment addresses, according to the obtained node distribution information of uniform address allocation, and the rearranged data includes the node number of the hypervisor node.

Wherein, two rearrangement modes are available for reorganizing the data in the storage apparatus based on the memory segment addresses: one is to rearrange the data in the storage apparatus in an ascending order of the memory segment addresses; and the other is to rearrange the data in the storage apparatus in a descending order of the memory segment addresses. Of course, the mode is not limited to the above, and the data in the storage apparatus may be rearranged in an order from the intermediate memory segment address to the higher ones, or an order from the intermediate memory segment address to the lower ones, which is not limited herein.

The above embodiment is a process for the hypervisor to export the memory data, and after the memory data is exported by the Hypervisor, the backup manager is required to collect and back up relevant profile of the virtual data center, and rearrange the data exported from respective nodes (i.e., the data stored in the memories, also called as memory data). A node having the hypervisor is not certainly a complete computer, and it may constitute one computer with uniform address allocation together with other nodes. In that case, all the node memories of uniform address allocation shall be rearranged according to the memory address spaces, please refer to FIG. 4 for details.

Figure 4:
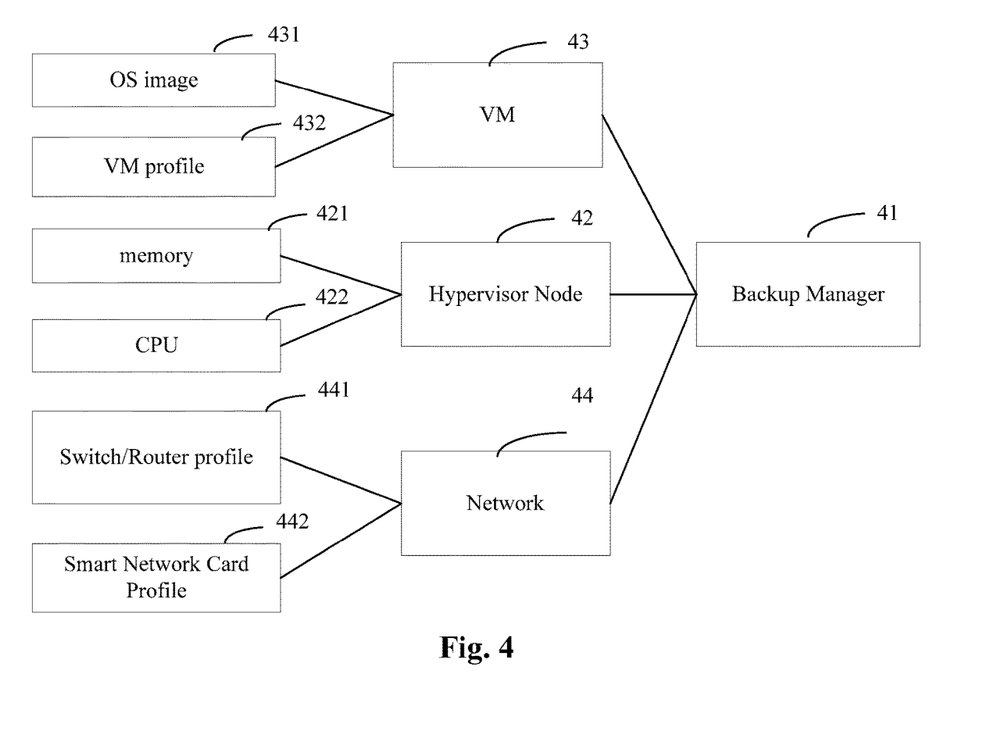
FIG. 4 is a structure diagram in which a backup manager provided by an embodiment of the present invention collects and backs up relevant profile of a virtual data center.

FIG. 4 is a structure diagram in which a backup manager provided by an embodiment of the present invention collects and backs up relevant profile of a virtual data center.

FIG. 4 illustrates the backups of a hypervisor 42, a VM 43 and a network 44 made by a backup manager 41, respectively, wherein, the backup of the VM 43 includes the backup of an OS image 431 and the backup of a VM profile 432; such information is static information stored at the data center, and the VM can start and run when there are only the OS image and the profile;

the backup of the hypervisor 42 includes the backup of a CPU 422 and the backup of a memory 421; the states of the memory and the CPU managed by the hypervisor are backed up, that is, the dynamic state of the data center (i.e., the running state at a certain time) is described; the backup of the hypervisor state enables the recovered data center to be completely the same as the original one;

the backup of the network 44 includes the backup of a switch/router profile 441 and the backup of a smart network card profile 442, wherein, the backup of a switch/router profile 441 includes the backup of a virtualized profile thereof. Since the VMs of the data center are not independent and they often exchange data with each other through the network, the recovered VMs of the data center cannot correctly access the network if the network profile is not backed up. In addition, the network of the data center also may be virtualized, and the router and switch available to the VM may not actually exist in the physical network. Such virtual profile may exist in a physical switch and a physical router, or a smart network card of the data center. Thus the backup of the above information can recover the network topology structure of the data center, so that the recovered VMs can normally access the network.

The backup of the smart network card profile 442 is also necessary because the smart network card may be used as a carrier of the virtual switch and the virtual router.

Wherein, the process of performing a virtualized data migration or backup according to the information includes:

when receiving a data migration or backup instruction, the hypervisor node exports the data stored in respective VMs of the hypervisor node to a storage apparatus according to the instruction, and transmits the profiles of respective VMs to the backup manager. The profiles of the VMs are profiles of the backed up VMs, and include, but not limited to, the OS images and profiles of respective VMs, or other information such as the backup of the hypervisor 42 and the backup of the network.

The backup manager obtains the profiles of respective VMs of at least one hypervisor node, i.e., it searches a memory file exported from the hypervisor, and reads a node number at the header of the memory file, so as to determine the node number of the hypervisor.

The backup manager reads the node profile (i.e., the node distribution information of uniform address allocation) from a hypervisor configuration file of corresponding hypervisor node according to the node number.

The backup manager rearranges the file in an ascending order of the memory segment addresses according to the node profile, and the rearranged file still reserves the backed up node information that serves as recovery reference information.

Of course, the backup manager may also rearrange the file in a descending order of the memory segment addresses according to the node profile, or rearrange the file in an order from the intermediate memory segment address to the higher or lower ones, which is not limited herein.

In the embodiment, the memory segment rearrangement enables a backup to be recovered to a computation node having a different memory size from the original backup system.

Moreover, in the embodiment of the present invention, not only the backup VM profile but also the backup OS image can be collected. Wherein, the VM profile usually exists in the form of configuration file, and stored in the same storage space with the OS image file. The backup manager shall copy the configuration files and OS image files of all the VMs to the backup storage apparatus, and parse the configuration files of the VMs, because the configuration file of each VM describes the resources configured for the VM stored in the current configuration file of the VM, e.g., the CPU amount, the memory size, the I/O port amount and type, the connected storage apparatus, etc. Such information is used for the environment verification when the data center is recovered.

Generally in the configuration file of the VM, the information related to the system hardware includes:
CD-settings (control domain configured node)
Network (network configuration)
Floppy-drives (floppy drive)
IDE (IDE hard disk drive)
Parallel ports (parallel port)

RAM (memory size)
SCSI (SCSI storage drive)
Serial ports (serial port)
Sound (sound card configuration)
USB port (USB port configuration)
CPU (number of virtual CPUs)

That is, the backup manager determines the node number of the hypervisor node, obtains the VM configuration files according to the hypervisor node corresponding to the node number, and collects and summarizes the resource types and amount information of all the VMs according to the filed descriptions in the VM configuration files.

Next, the backup manager may access the LAN of the virtual data center, obtain all the devices in the network using the SNMP protocol, generate a topology structure diagram of the network, and store the topology structure diagram in the backed up storage apparatus.

Wherein, the topology structure of the network describes the logical network structure of the data center, and the structure is very important to normal communication of the VM in the data center; under normal circumstances, when the network profiles of all the switches, routers and smart network cards are recovered and all the VMs are started, the recovered data center shall have the same network topology structure as the backed up data center. In that case, the network topology structure may be used for the verification to determine that the network is correctly recovered.

In the embodiment of the present invention, since each hypervisor is added with the memory dump capable of directly exporting memory data from the hypervisor, the data in all the VMs of one data center can be backed up simultaneously, so that the backup manager rearranges the memory data exported from different virtual machines, and the advantages are as follows:

It is unnecessary to concern how many VMs run at the data center during the data migration or backup.

The associations between the VMs are also backed up during the data migration or backup, so it is unnecessary to concern the recovery orders of the VMs when the data of the data center is recovered.

When the memory data is directly exported from the hypervisor, it is unnecessary to notify the upper layer OS for a data backup, thereby improving the backup efficiency and reducing the system logical complexity.

Figure 5:
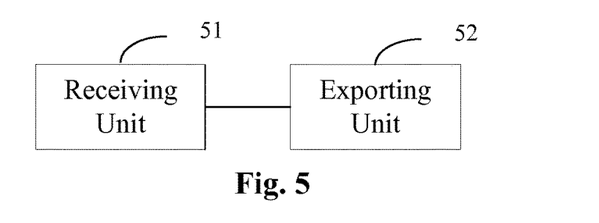
FIG. 5 is a structure diagram of a device for virtualized data migration or backup provided by an embodiment of the present invention.

Based on the implementation of the above method, the embodiments of the present invention further provide a device for virtualized data migration or backup, as illustrated in FIG. 5, including: a receiving unit 51, a exporting unit 52 and a transmitting unit 53, wherein, the receiving unit 51 is configured to receive a data migration or backup instruction, i.e., a data migration or backup instruction transmitted by a manager of a VM or a VM OS, or a data migration or backup instruction transmitted by other upper layer node;

the exporting unit 52 is configured to export data stored in respective VMs in the hypervisor node to a storage apparatus, according to the instruction, including a processor managing unit, a plurality of memory units, a resource applying unit and a data export unit, wherein, the processor managing unit is configured to stop scheduling CPUs of respective VMs according to the instruction;

the plurality of memory units are configured to store the data of each VM, when the processor managing unit stops scheduling the CPUs of respective VMs;

the resource applying unit is configured to apply for a segment of storage space in the storage apparatus connected to the hypervisor node, and record a node number of the hypervisor node in the storage space; and the data export unit is configured to export the data in the plurality of memory units to the storage space.

Please refer to corresponding implementations in the aforementioned method for the implementations of the functions and effects of respective units in the device, and herein are omitted.

Figure 6:
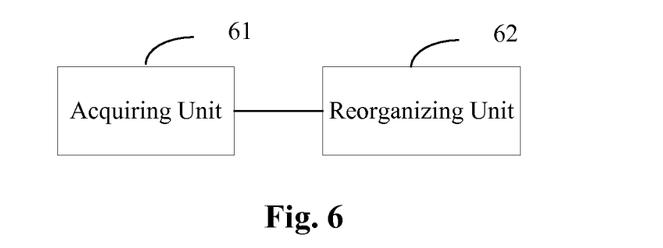
FIG. 6 is a structure diagram of a device for virtualized data rearrangement provided by an embodiment of the present invention.

Correspondingly, the embodiments of the present invention further provide a device for virtualized data rearrangement, and FIG. 6 illustrates its structure diagram. The device is connected to a storage apparatus that stores data stored in respective VMs of at least one hypervisor node. The device includes: an acquiring unit 61 and a reorganizing unit 62, wherein the acquiring unit 61 is configured to obtain profiles of respective VMs of at least one hypervisor node; and the reorganizing unit 62 is configured to rearrange the data in the storage apparatus according to the profiles.

Wherein, the acquiring unit 61 includes a searching unit and an address acquiring unit, wherein the searching unit is configured to search data (e.g., a memory file) exported from the hypervisor node, and obtain a node number of the hypervisor node from the data; and the address acquiring unit is configured to obtain node distribution information of uniform address allocation from a hypervisor configuration file of the hypervisor node according to the node number.

The reorganizing unit 62 is specifically configured to rearrange the data in the storage apparatus based on the memory segment addresses, according to the obtained node distribution information of uniform address allocation, and the rearranged data includes the node number of the hypervisor node.

Please refer to corresponding implementations in the aforementioned method for the implementations of the functions and effects of respective units in the device, and herein are omitted.

Figure 7:
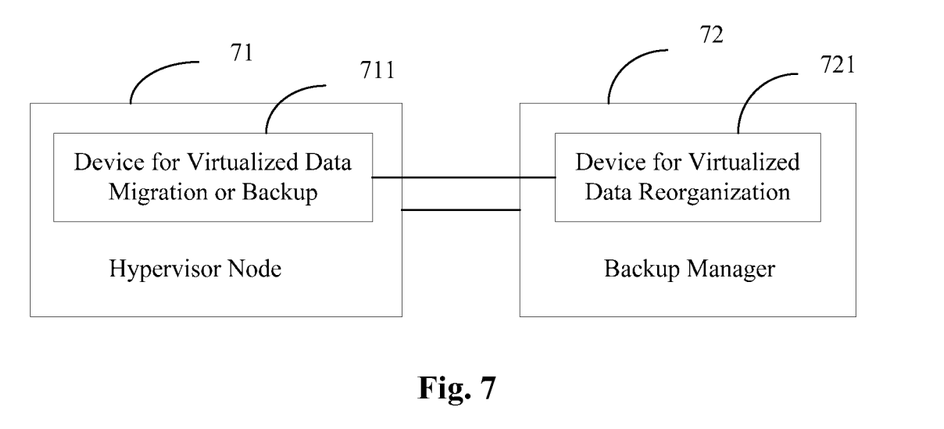
FIG. 7 is a structure diagram of a virtualized data center system provided by an embodiment of the present invention.

Correspondingly, the embodiments of the present invention further provide a virtualized data center system, and FIG. 7 illustrates its structure diagram. The system includes a hypervisor node 71 and a backup manager 72, wherein the hypervisor node 71 includes a device 711 for virtualized data migration or backup, and the backup manager 72 includes a device 721 for virtualized data rearrangement, wherein, the hypervisor node is configured to receive a data migration or backup instruction, and export data stored in respective VMs in the hypervisor node to a storage apparatus, according to the instruction;

the backup manager is configured to obtain profiles of respective VMs in the hypervisor node, and rearrange the data in the storage apparatus according to the profiles.

Wherein, the device for virtualized data migration or backup includes a receiving unit and an exporting unit. The implementations of the functions and effects of respective units are the same as those described previously, and herein are omitted.

The device for virtualized data rearrangement includes an acquiring unit and a reorganizing unit. The implementations of the functions and effects of respective units are the same as those described previously, and herein are omitted.

In the embodiment of the present invention, the memory data in all the VMs of one data center can be backed up simultaneously, and the associations between the VMs are also backed up during the backup, so it is unnecessary to concern the recovery orders of the VMs when the data of the data center is recovered. Meanwhile, when the memory data is directly exported from the hypervisor, it is unnecessary to notify the upper layer OS for a data backup, thereby improving the data backup efficiency and reducing the logical system complexity.

Through the descriptions of the above embodiments, a person skilled in the art will clearly know that the present invention can be implemented by means of a combination of software and necessary general hardware platform, and of course just through hardware, but the former is better under many circumstances. Based on such understanding, the technical solutions of the present invention substantively, or a part thereof making a contribution to the prior art, may be reflected in the form of computer software product stored in a storage medium such as ROM/RAM, magnetic disk and optical disk, and it include several instructions to enable a computer equipment (e.g., personal computer, server, network facility, etc.) to execute the methods of respective embodiments or certain parts thereof in the present invention.

The above descriptions are just preferred embodiments of the present invention. To be noted, any improvement or modification made by a person skilled in the art without deviating from the principle of the present invention shall be covered by the protection scope of the present invention.

What is claimed is:

1. A data center, comprising a plurality of computation nodes and a backup manager, wherein each computation node comprises a hypervisor and a memory unit, wherein the hypervisor of each computation node is configured to create a plurality of virtual machines, and wherein all virtual machines in the data center share resources of all memory units of the data center and each virtual machine is allocated a memory segment address which is allocated in a manner of uniform address allocation in the memory resources of all memory units, wherein the hypervisor of each computation node exports all data in the memory unit of the computation node and stores the exported data to a storage apparatus, and records a node number of the computation node in the storage apparatus;

wherein the backup manager communicates with the storage apparatus, and obtains profiles of the plurality of virtual machines according to the node number of the computation node, wherein the profiles of the plurality of virtual machines comprises a memory segment address of each virtual machine allocated in a manner of uniform address allocation in the memory resources of all memory units shared by all virtual machines in the data center, and wherein the backup manager rearranges the data of the plurality of virtual machines in the plurality of computation nodes stored in the storage apparatus according to the memory segment address of each virtual machine.

2. The data center according to claim 1, wherein the hypervisor of each computation node, is further configured to stop scheduling CPUs of the virtual machines in the computation node, and store cache data and unwritten cache data of the virtual machines in the computation node to memory of the virtual machines in the computation node.

3. The data center according to claim 1, wherein the hypervisor of each computation node is configured to apply for a segment of storage space in the storage apparatus, records the node number of the computation node in the storage space, and exports the data to the storage space.

4. The data center according to claim 1, wherein the backup manager is configured to search the data stored in the storage apparatus according to a node number of each computation node, obtain the profiles of each virtual machine in the data center from configuration files of each virtual machine.

5. The data center according to claim 1, wherein the backup manager is configured to rearrange the data stored in the storage apparatus in an ascending order of the memory segment address of each virtual machine or a descending order of the memory segment address of each virtual machine.

6. A method for backing up data of a data center, wherein the data comprises a plurality of computation nodes and a backup manager, wherein each computation node comprises a hypervisor and a memory unit, wherein the hypervisor of each computation node is configured to create a plurality of virtual machines, and wherein all virtual machines in the data center share resources of all memory units of the data center and each virtual machine is allocated a memory segment address which is allocated in a manner of uniform address allocation in the memory resources of all memory units, the method comprising:

exporting, by the hypervisor of each computation node, all data in the memory unit of the computation node and storing the exported data to a storage apparatus, and recording a node number of the computation node in the storage apparatus;

obtaining, by the backup manager communicating with the storage apparatus, profiles of the plurality of virtual machines according to the node number of the computation node, wherein the profiles of the plurality of virtual machines comprise a memory segment address of each virtual machine allocated in a manner of uniform address allocation in the memory resources of all memory units shared by all virtual machines in the data center; and rearranging, by the backup manager, the data of the plurality of virtual machines in the plurality of computation nodes stored in the storage apparatus according to the memory segment address of each virtual machine.

7. The method according to claim 6, wherein before exporting data of the virtual machines in the computation node, the method further comprises:

stopping, by the hypervisor of each computation node, scheduling CPUs of the virtual machines in the computation node; and storing, by the hypervisor of each computation node, cache data and unwritten cache data of the virtual machines in the computation node to memory of the virtual machines in the computation node.

8. The method according to claim 6, wherein exporting data of the virtual machines in the computation node comprising:

applying, by the hypervisor of each computation node, for a segment of storage space in the storage apparatus;

recording, by the hypervisor of each computation node, a node number of the computation node; and exporting, by the hypervisor of each computation node, the data of the virtual machines in the computation node to the storage space.

9. The method according to claim 6, wherein obtaining, by the backup manager communicating with the storage apparatus, profiles of the virtual machines in the plurality of computation nodes comprising:

searching, by the backup manager, the data stored in the storage apparatus according to a node number of each computation node; and obtaining, by the backup manager, the profiles of each virtual machine in the data center from configuration files of each virtual machine.

10. The method according to claim 6, wherein the backup manager rearranges the data stored in the storage apparatus in an ascending order of the memory segment address of each virtual machine or a descending order of the memory segment address of each virtual machine.

11. A computation node for backing up data of a data center, wherein the data center comprises a plurality of computation nodes and a backup manager, wherein each computation node comprises a hypervisor and a memory unit, wherein the hypervisor of each computation node is configured to create a plurality of virtual machines, and wherein all virtual machines in the data center share resources of all memory units of the data center and each virtual machine is allocated a memory segment address which is allocated in a manner of uniform address allocation in the memory resources of all memory units, wherein the hypervisor of each computation node exports all data in the memory unit of computation node and stores the exported data to a storage apparatus, and records a node number of the computation node in the storage apparatus;

wherein the backup manager communicates with the storage apparatus, and obtains profiles of the plurality of virtual machines according to the node number of the computation node, wherein the profiles of the virtual machines comprise a memory segment address of each virtual machine allocated in a manner of uniform address allocation in the memory resources of all memory units shared by all virtual machines in the data center, and wherein the backup manager rearranges the data of the plurality of virtual machines in the plurality of computation nodes stored in the storage apparatus according to the memory segment address of each virtual machine.

12. The computation node according to claim 11, wherein each computation node, is further configured to stop scheduling CPUs of the virtual machines in the computation node, and store cache data and unwritten cache data of the virtual machines in the computation node to memory of the virtual machines in the computation node.

13. The computation node according to claim 11, wherein each computation node is configured to apply for a segment of storage space in the storage apparatus, record a node number of the computation node, and export the data of the virtual machines in the computation node to the storage space.

14. The computation node according to claim 11, wherein one of the computation nodes is configured to search the data stored in the storage apparatus according to a node number of each computation node, obtain the profiles of each virtual machine in the data center from configuration files of each virtual machine.

15. The computation node according to claim 11, wherein one of the computation nodes is configured to rearrange the data stored in the storage apparatus in an ascending order of the memory segment address of each virtual machine or a descending order of the memory segment address of each virtual machine.

* * * * *